Figure 6:
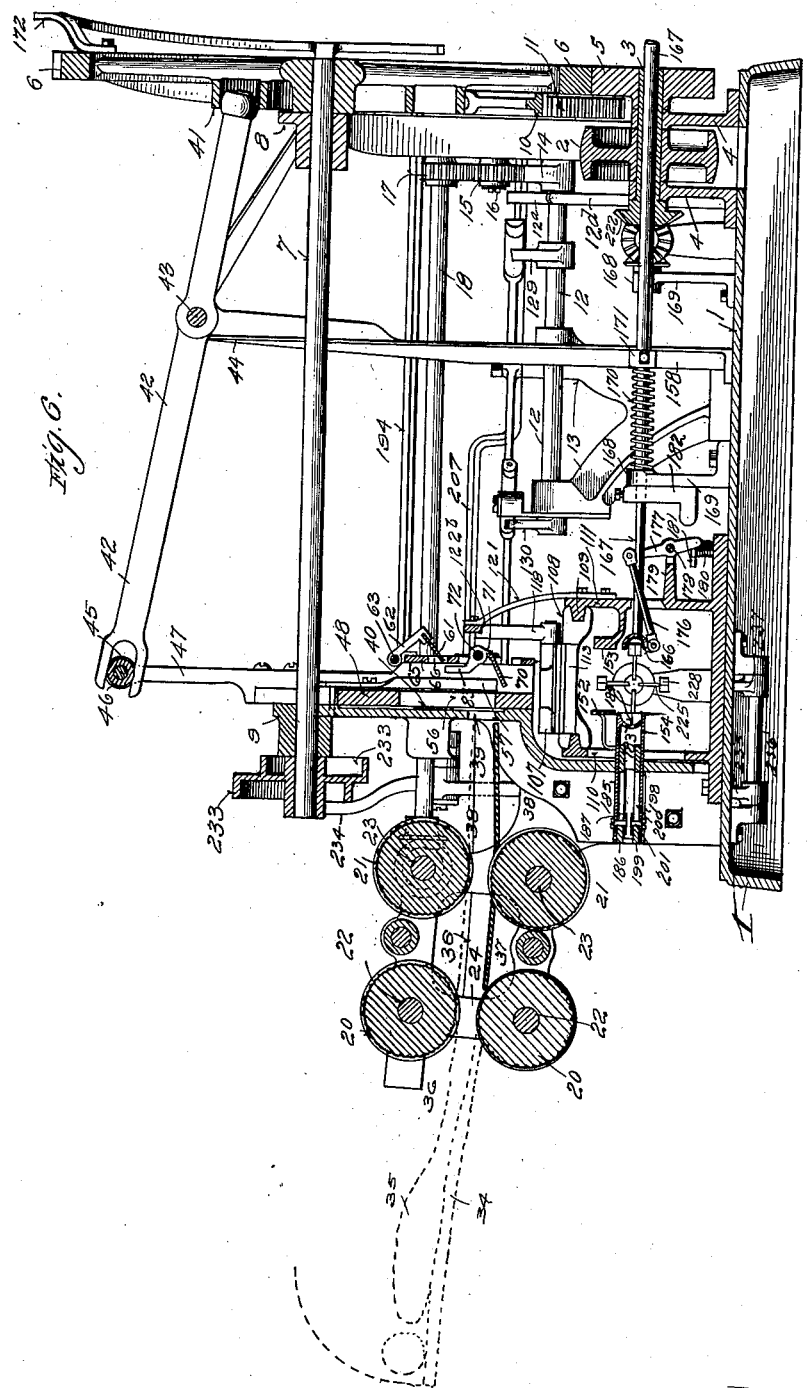

No. 833,785. PATENTED OCT. 23, 1906.
D. T. IGOU.
MACHINE FOR FORMING AND WRAPPING CONFECTIONS.
APPLICATION FILED MAR. 26, 1903.
9 SHEETS—SHEET 1.
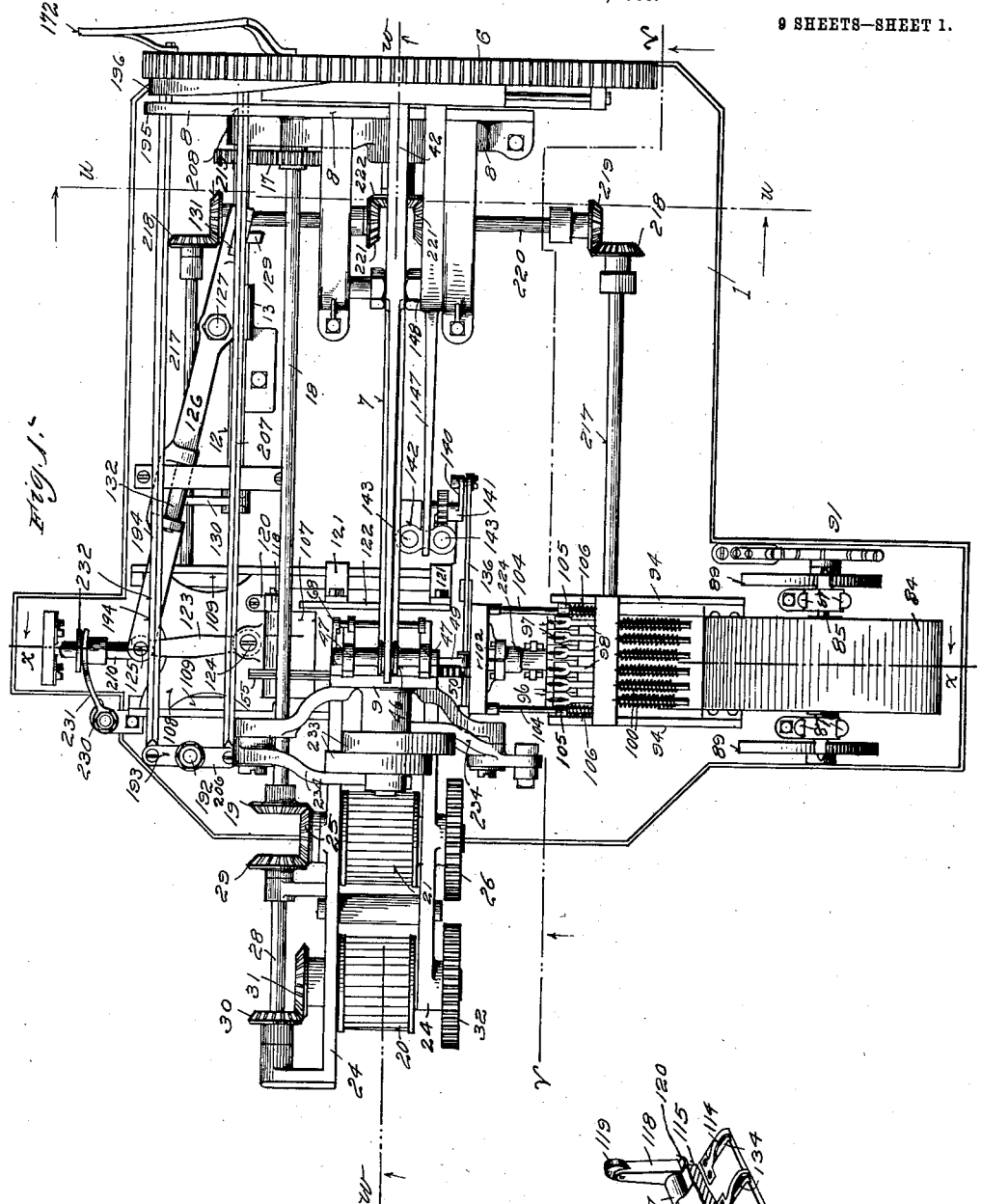
WITNESSES:
M. H. Walmsley
Irvine Miller
INVENTOR
Dennis T. Igou
BY
H. A. Toulman
ATTORNEY.

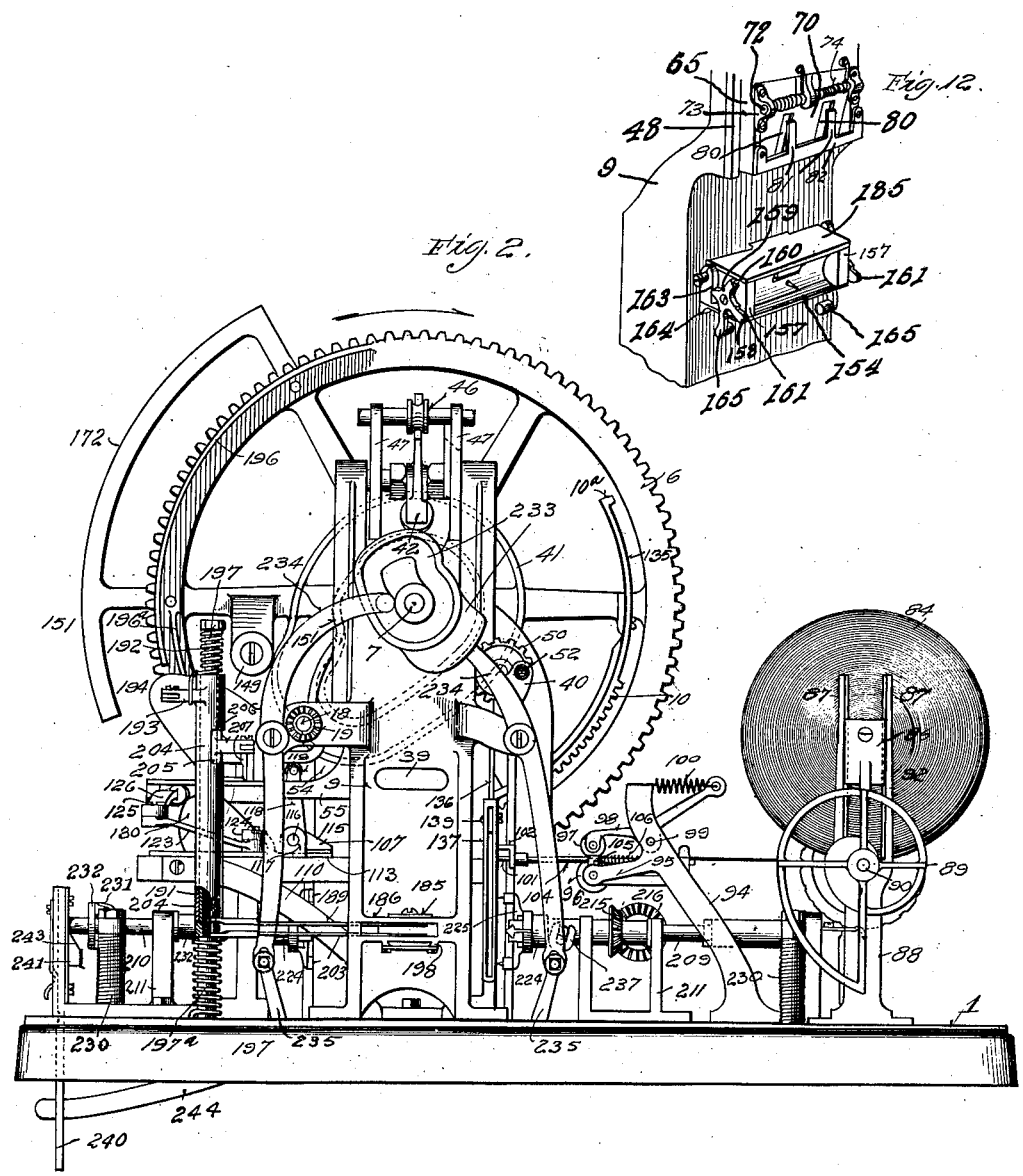

No. 833,785. PATENTED OCT. 23, 1906.
D. T. IGOU.
MACHINE FOR FORMING AND WRAPPING CONFECTIONS.
APPLICATION FILED MAR. 26, 1903.
9 SHEETS—SHEET 3.
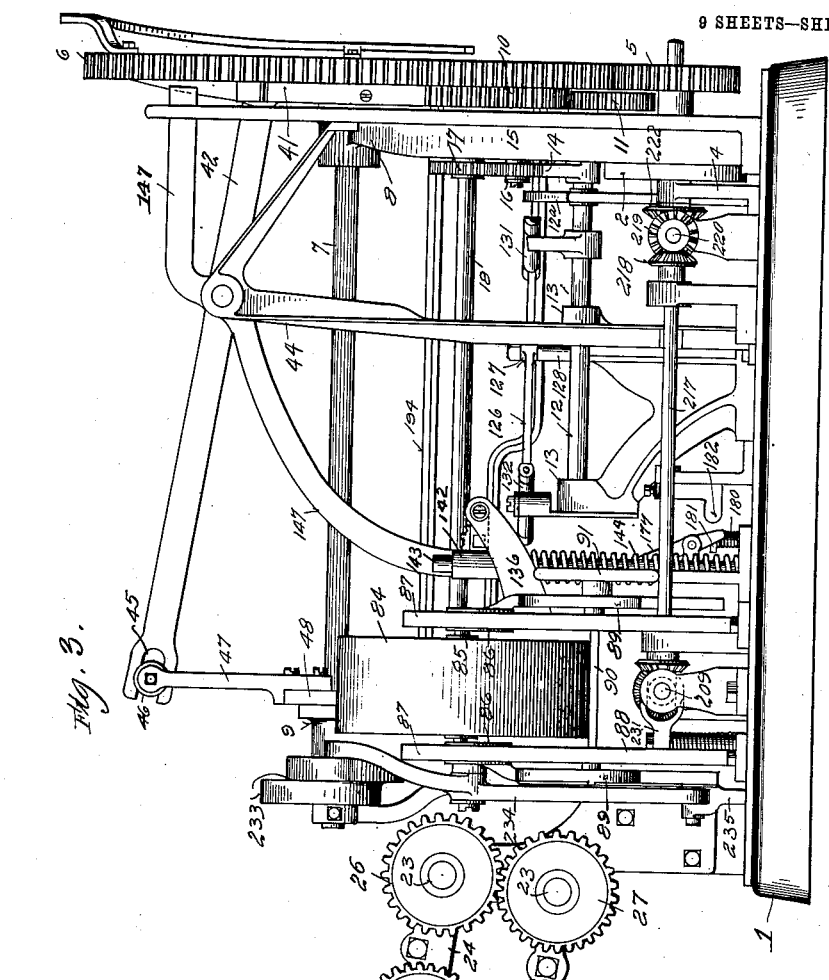
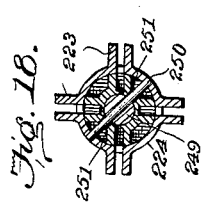
WITNESSES:
G. H. Walmsley.
Irvine Miller.
Dennis T. Igou,
INVENTOR,
BY H. A. Toulmin
ATTORNEY.

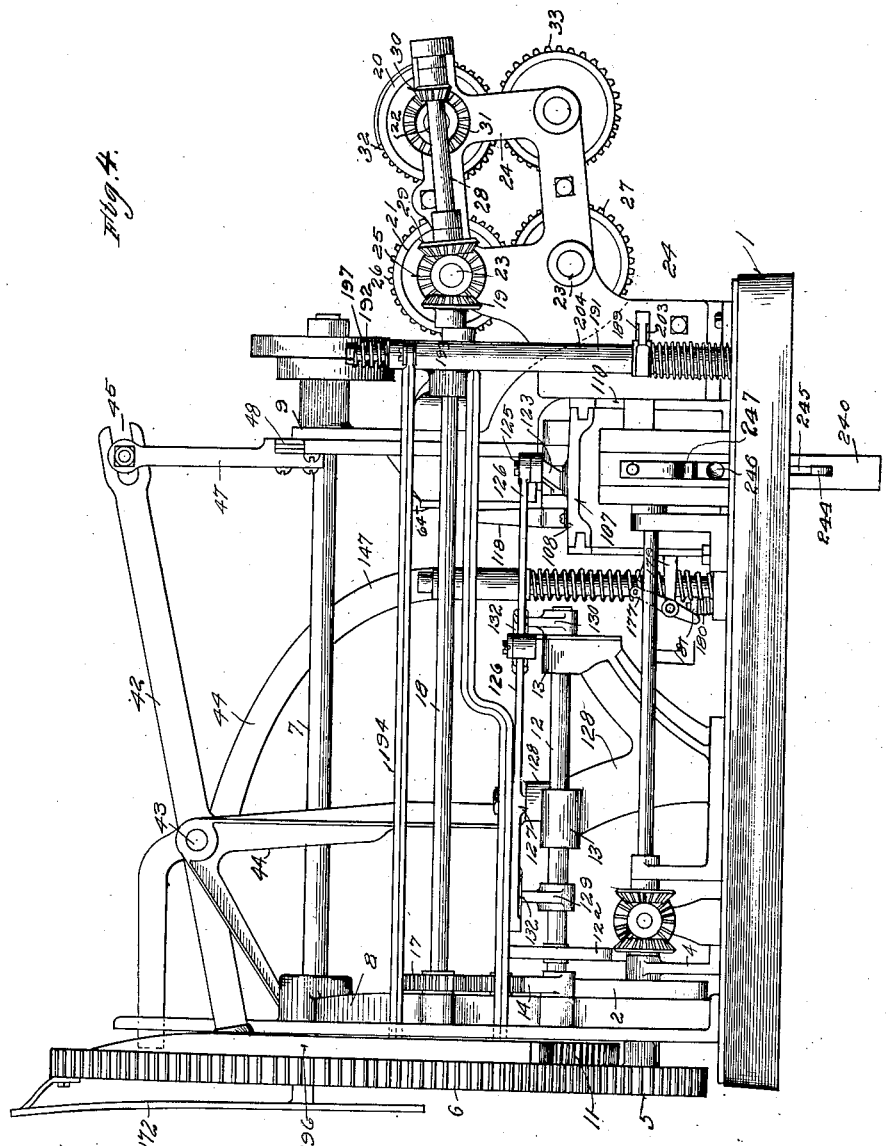

No. 833,785. PATENTED OCT. 23, 1906.
D. T. IGOU.
MACHINE FOR FORMING AND WRAPPING CONFECTIONS.
APPLICATION FILED MAR. 26, 1903.
9 SHEETS—SHEET 5.
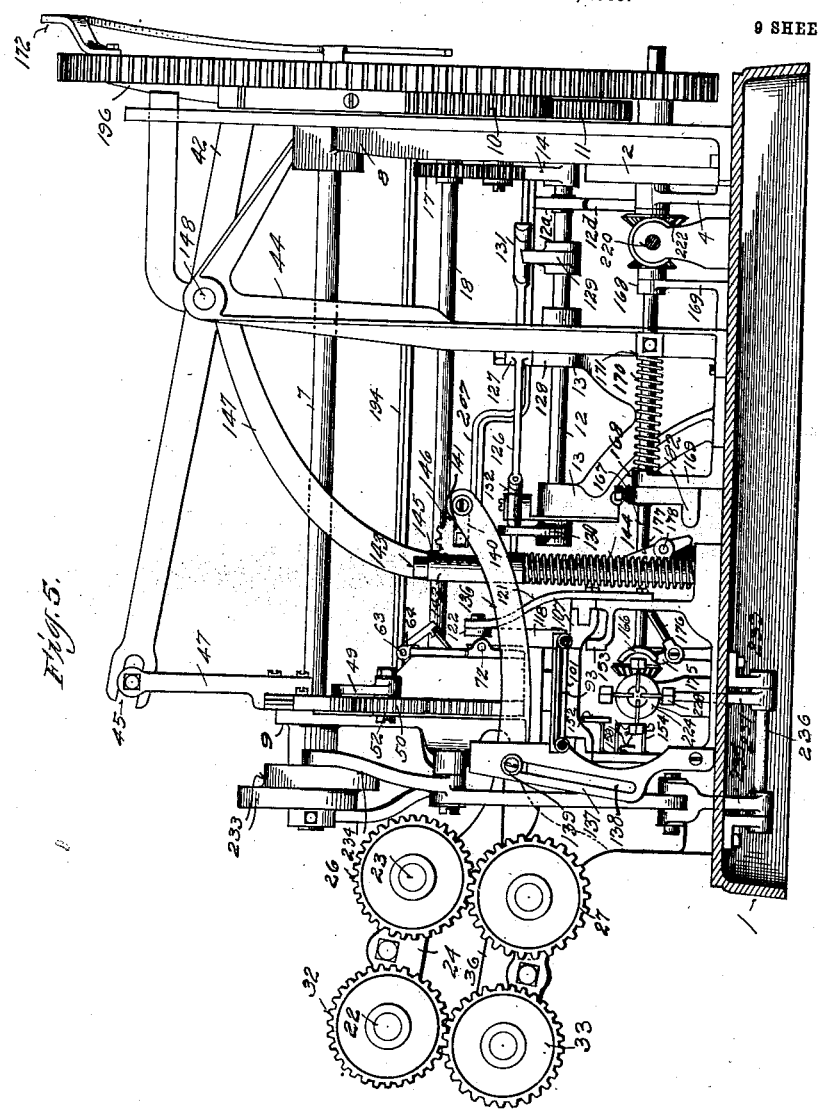

No. 833,785. PATENTED OCT. 23, 1906.
D. T. IGOU.
MACHINE FOR FORMING AND WRAPPING CONFECTIONS.
APPLICATION FILED MAR. 26, 1903.

9 SHEETS—SHEET 6.

WITNESSES:

Dennis T. Igou,
INVENTOR

BY
ATTORNEY

No. 833,785. PATENTED OCT. 23, 1906.
D. T. IGOU.
MACHINE FOR FORMING AND WRAPPING CONFECTIONS.
APPLICATION FILED MAR. 26, 1903.
9 SHEETS—SHEET 7.
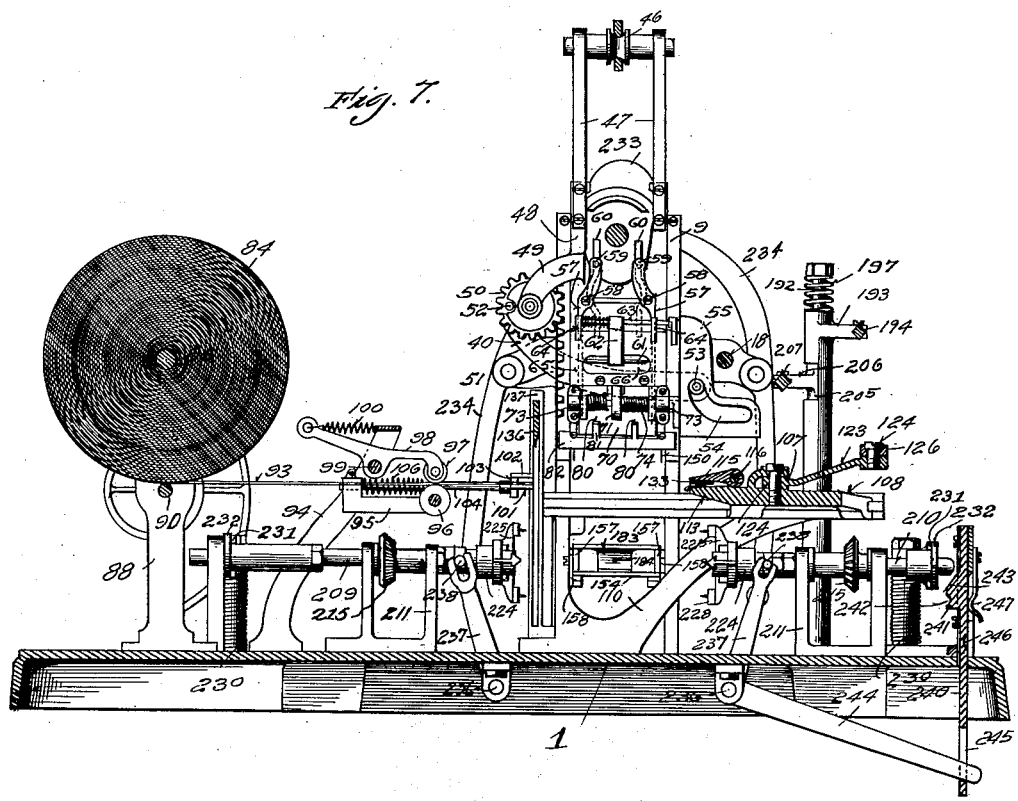
WITNESSES:
Dennis T. Igou,
INVENTOR
ATTORNEY.

No. 833,785. PATENTED OCT. 23, 1906.
D. T. IGOU.
MACHINE FOR FORMING AND WRAPPING CONFECTIONS.
APPLICATION FILED MAR. 26, 1903.
9 SHEETS—SHEET 8.
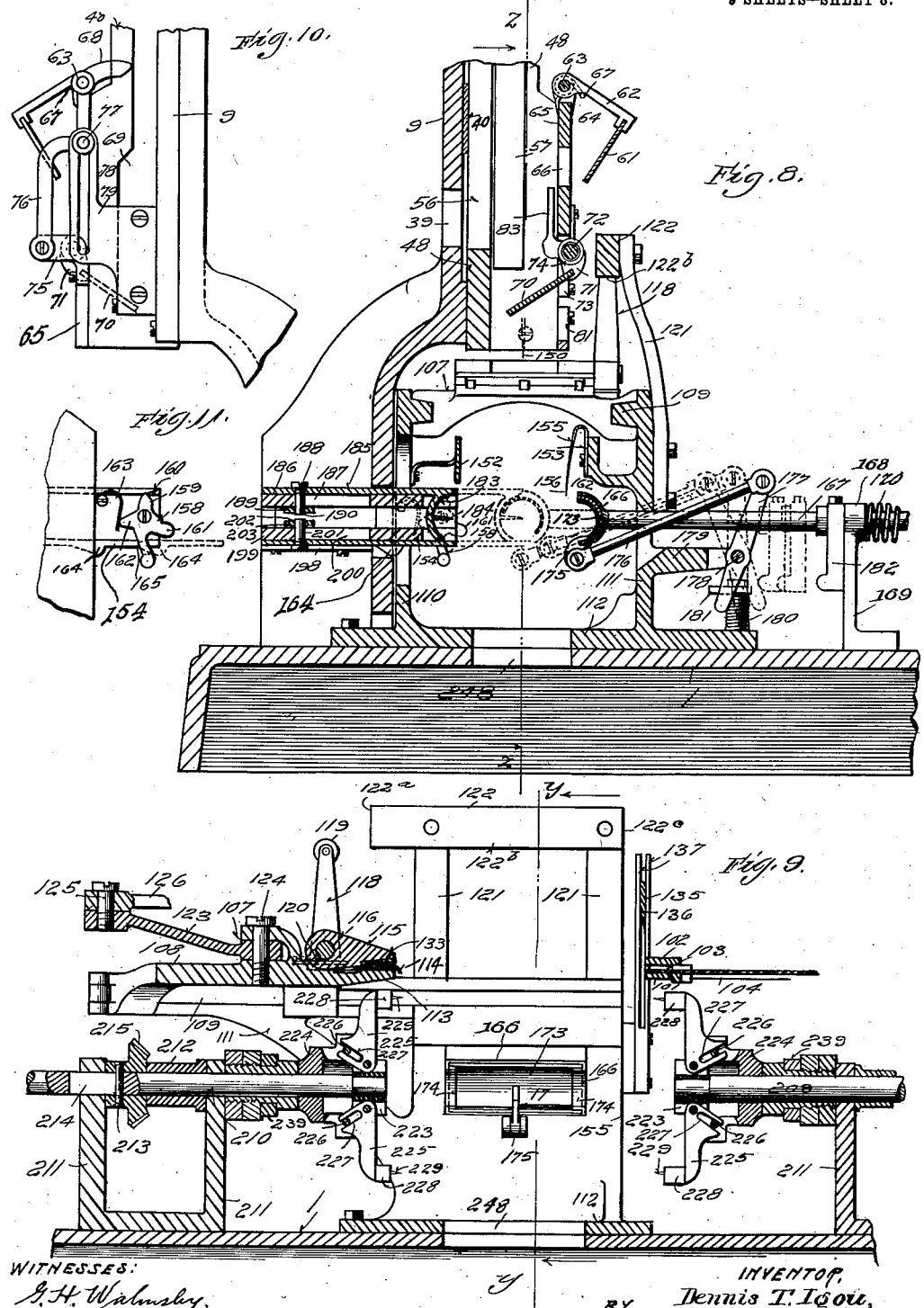

No. 833,785. PATENTED OCT. 23, 1906.
D. T. IGOU.
MACHINE FOR FORMING AND WRAPPING CONFECTIONS.
APPLICATION FILED MAR. 26, 1903.
9 SHEETS—SHEET 9.
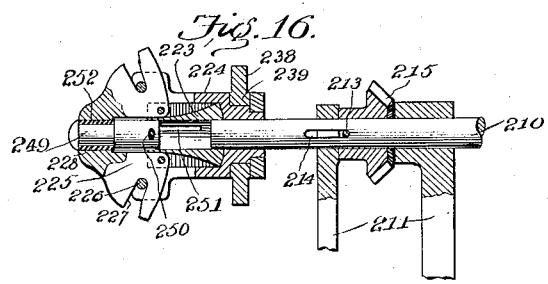
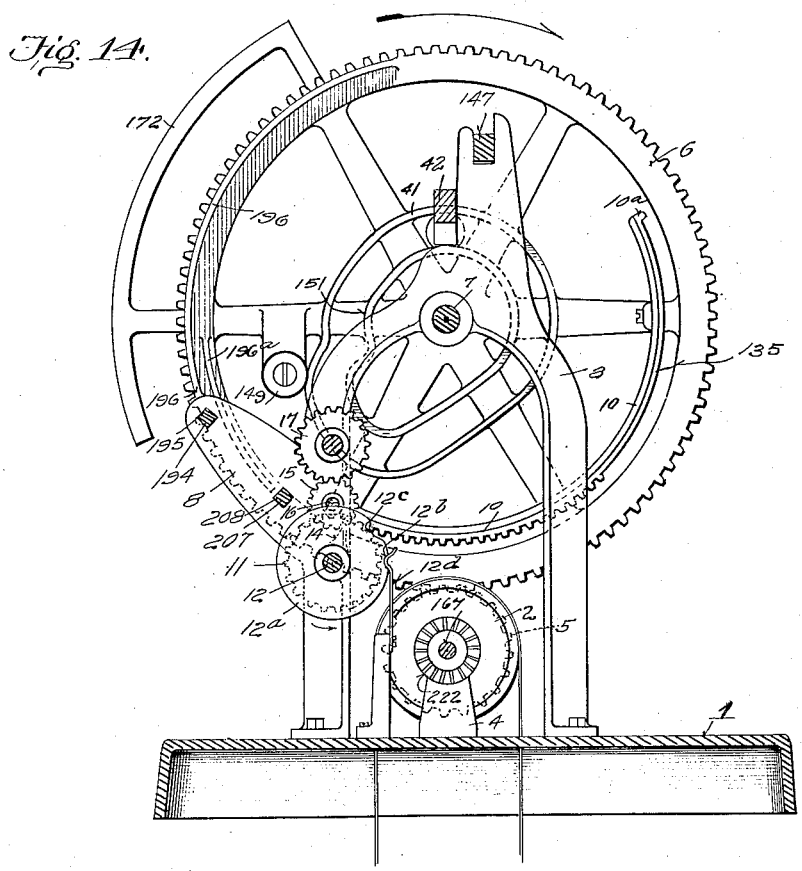
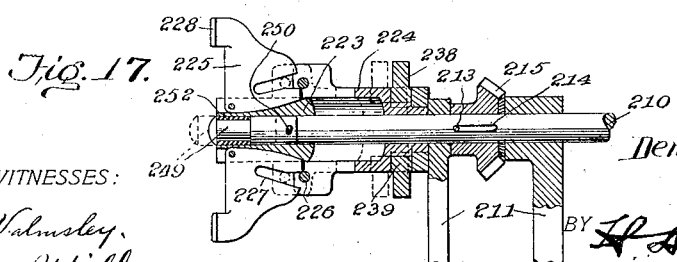
WITNESSES:
G. H. Walmsley.
Irene Miller.
Dennis T. Igou,
INVENTOR.
BY
ATTORNEY.

UNITED STATES PATENT OFFICE.

DENNIS T. IGOU, OF SPRINGFIELD, OHIO, ASSIGNOR TO THE STANDARD CANDY MACHINE COMPANY, OF COLUMBUS, OHIO, A CORPORATION OF OHIO.

MACHINE FOR FORMING AND WRAPPING CONFECTIONS.

No. 833,785.  Specification of Letters Patent.  Patented Oct. 23, 1906.

Application filed March 26, 1903. Serial No. 149,681.

*To all whom it may concern:*

Be it known that I, DENNIS T. IGOU, a citizen of the United States, residing at Springfield, in the county of Clark and State of Ohio, have invented certain new and useful Improvements in Machines for Forming and Wrapping Confections, of which the following is a specification, reference being had therein to the accompanying drawings.

This invention relates to wrapping-machines, and more particularly to machines for forming and wrapping confections, and has for its object to provide a machine designed primarily for the purpose of taking from the mass of candy a portion thereof, subdividing the same to form confections, and wrapping the confections thus formed in a wrapper of paper or the like, secured by having its projecting ends twisted in opposite directions.

More specifically, the object of my invention is to produce a machine wherein these several operations will be automatically performed with certainty and speed, thereby reducing the cost of preparing the confections for the market.

To these ends my invention consists in certain novel features, which I will now proceed to describe and will then particularly point out in the claims.

In the accompanying drawings, Figure 1 is a plan view of a machine embodying my invention. Fig. 2 is an end elevation thereof, with the candy-feeding rolls removed. Fig. 3 is an elevation of one side of the machine. Fig. 4 is an elevation of the opposite side of the machine. Fig. 5 is a vertical sectional view taken on the line $v\,v$ of Fig. 1 and looking in the direction of the arrows. Fig. 6 is a vertical sectional view taken on the line $w\,w$ of Fig. 1 and looking in the direction of the arrows. Fig. 7 is a vertical sectional view taken on the line $x\,x$ of Fig. 1 and looking in the direction of the arrows. Fig. 8 is a detail sectional view taken on the line $y\,y$ of Fig. 9 and looking in the direction of the arrows. Fig. 9 is a detail sectional view taken on the line $z\,z$ of Fig. 8 and looking in the direction of the arrows. Fig. 10 is a detail view of the supporting-plates of the plunger and their operating mechanism, the same being shown in side elevation. Fig. 11 is a detail view, illustrating a portion of the mechanism for stripping the wrapper-blank from the plunger. Fig. 12 is a detail perspective view of a part of the plunger and of the paper stripping and folding devices. Fig. 13 is a detail perspective view of the gripper for pulling and feeding the paper. Fig. 14 is a vertical sectional view taken on the line U U of Fig. 1 and looking in the direction of the arrows. Fig. 15 is a view of the completed product of the machine. Fig. 16 is a detail sectional view showing a modification of the twister. Fig. 17 is a similar view showing a different position of the parts, and Fig. 18 is a transverse sectional view of the same.

Considered as a whole, the machine in the embodiment thereof chosen for purposes of illustration comprises four main groups of mechanism, to wit: first, the confection-forming mechanism; second, the conveying mechanism, whereby the confections are carried to the wrapping mechanism; third, the paper feeding and cutting mechanism, whereby the paper is fed to the wrapping mechanism and cut to form blank wrappers, and, fourth, the wrapping mechanism proper. These several groups, which constitute the machine, are supported upon a bed or table 1 and are driven by means of a belt from any suitable source of power, passing around a pulley 2, secured on a shaft 3, mounted in suitable bearings 4 on the bed or table 1. The shaft 3 carries at its rear end a pinion 5, which meshes with a gear 6, from which most of the moving parts of the machine derive their motion. This gear is secured on the rear end of a shaft 7, extending longitudinally of the machine some distance above the bed 1 and supported at its ends in uprights or brackets 8 and 9, arising from the bed of the machine at the rear and front ends thereof, respectively.

*Confection-forming mechanism.*—I will first refer to the confection-forming mechanism, the functions of which are to draw the candy from a batch or mass, form it into a bar and feed this bar forward, severing it intermittently to form the confections. This mechanism receives its motion from the gear 6, which is provided on its front face with a gear-segment 10, which meshes with a gear 11 on a longitudinal shaft 12, mounted in suitable bearings 13, arising from the bed 1. The shaft 12 thus has an intermittent rotary motion to the extent of one complete revolution at each movement. Said shaft 12 carries an arm 14, provided with a single tooth, which meshes with a gear 15, secured on a stud-shaft 16, projecting from the front face of the upright 8, said gear 15 being an idle gear, which meshes with a gear 17 on a longitudinal shaft 18, provided at its forward end with a bevel-gear 19.

The candy-feeding mechanism comprises, preferably, two pairs of feed-rollers 20 and 21, mounted on shafts 22 and 23, respectively, said shafts being carried in a bracket-frame 24. The number of feed-rollers may be varied. The upper shaft 23 is provided at one end with a bevel-gear 25, which meshes with the bevel-gear 19 and at its other end is provided with a gear 26, which meshes with a corresponding gear 27 on the lower shaft 23. A side shaft 28, supported from the bracket-frame 24, is provided with a bevel-gear 29, meshing with the gear 25 and with a bevel-gear 30, meshing with a similar gear 31 on one end of the upper shaft 22. The other end of said shaft 22 is provided with a gear 32, which meshes with a similar gear 33 on the lower shaft 22. In this way the two pairs of feed-rollers have an intermittent rotary motion imparted to them.

The first pair of feed-rollers 20 are located adjacent to a spinning-table 24, on which a batch of candy (illustrated at 35) is kept in a suitable condition for working by the usual provisions for that purpose. A trough-like conduit 36 extends from the spinning-table to the first pair of feed-rolls, and a similar trough-like conduit 37 is located between the two pairs of feed-rolls. A third trough-like conduit 38 extends from the second pair of feed-rolls to an opening 39 in the upright 9.

Immediately back of the upright 9 and working along the rear face thereof is a knife or cutter 40, which is moved past the opening 39 at intervals by means of the following mechanism. The gear 6 carries a grooved cam 41, in which lies the rear end of a lever 42, pivoted between its ends at 43 to a support 44. The forward end of this lever is slotted, as indicated at 45, to receive a roller 46, carried by arms 47, extending upward from a vertically-moving plunger 48, traveling in suitable ways on the rear face of the upright 9. This plunger carries a bracket-arm 49, in which is mounted a pinion 50, which meshes with a fixed rack 51 on the side of the upright 9, so that as the plunger descends and ascends an intermittent reverse movement of rotation is imparted to the pinion 50. One end of the knife 40 is eccentrically pivoted on the front face of the pinion 50, as indicated at 52, while the other end of the knife is provided with a projection 53, preferably in the form of a roller, traveling in a cam-slot 54, formed in a plate 55, attached to the side of the upright 9. By reason of this construction a downward diagonal movement is imparted to the knife past the opening 39 in the upright.

In practice a portion of the batch of candy lying on the spinning-table will be drawn or worked toward the edge thereof and along the trough 36 to the first pair of feed-rolls 20. These rolls, in conjunction with the second pair of feed-rolls 21 and the troughs or conduits 37 and 38, will feed the candy forward intermittently, at the same time shaping it into the form of a flattened bar. The end of this bar will be projected through the opening 39 at each feeding movement to an extent sufficient to provide material for the desired confection, and after said end is thus projected the knife 40 will descend and will sever the projecting end with a draw-cut, and thus complete the formation of the confection. The knife will then ascend and the bar of candy will be fed forward as before.

*Confection-conveying mechanism.*—Reference will next be made to the mechanism whereby the confection is carried from the point where it is formed to the point where it is wrapped. This latter point lies immediately below the former point, and the vertically-movable plunger 48, hereinbefore referred to, and its associated mechanism constitute the means whereby the confection is conveyed from one point to the other, said mechanism being aided by gravity. The plunger is hollow and has in its front wall an opening 56, on each side of which is located a guide-arm 57, pivoted at 58 to the rear face of the front wall of the plunger and extending above the pivot, its upper end being provided with a pin 59, which engages a cam-slot 60 in the upright 9. The centering and guiding arms 57 thus extend vertically on each side of the opening 56, through which the confection passes, said arms determining the two sides of the path through which the confection moves through the plunger. The cam-slots 60 are so constructed that these guiding and centering arms approach each other after the passage of the confection by gravity from the receiving-plate to the delivering-plate, hereinafter described, and thus insure its final placing on the delivering-plate in a properly-centered position.

The receiving-plate is indicated at 61 and is carried by an arm 62, secured to a shaft 63, mounted in bearings 64 on the upper end of a plate 65, fastened to the rear open face of the plunger. The plate 65 has an opening 66, through which the receiving-plate 61 may be projected to receive the confection. The shaft 63 is provided with a spring or springs 67, which tend to throw the receiving-plate 61 outward out of the path of the confection, as shown, for instance, in Figs. 8 and 10. Said shaft 63 is provided at one end with an arm 68, in the path of which lies a fixed cam 69, secured to the rear of the upright 9. The construction of the cam 69 is such that when the plunger is in the upper portion of its travel the receiving-plate 61 is withdrawn, as shown, while during the lower part of the travel of the plunger said receiving-plate is projected into the interior of the plunger so that its forward edge lies adjacent to the rear face of the front wall of the plunger.

The delivering-plate is indicated at 70 and is a flat plate similar to the receiving-plate 61 and carried by an arm 71, projecting from a shaft 72, mounted in bearings 73 on the rear edges of the side plates of the plunger. The shaft 72 is provided with one or more springs 74, which serve to hold the delivering-plate 70 normally in the position shown in Fig. 8. Said shaft 72 is provided at one end with an arm 75, to which is pivoted one end of a link 76, which link is provided at its other end with a pin or projection 77, which travels in a slot 78 in a fixed plate 79, secured to the upright 9. The delivering-plate 70 maintains the position shown in Fig. 8 throughout the travel of the plunger, except during the period when the plunger is moving over the extreme lower portion of its path. At this time the pin 77 strikes the lower end of the slot 78 and the delivering-plate 70 swings downward and outward to a position outside of the plunger. The construction and arrangement of these parts is such that when the plunger has reached the downward limit of its motion and the confection has been cut from the bar of candy in the manner hereinbefore described the receiving-plate 61 is projected inward within the plunger, so as to lie below the opening 39, and said receiving-plate receives the confection after it has been thus cut off. The plunger then rises, and the delivering-plate 70 is moved inward and upward into the plunger in position to receive the confection, which is now being carried upward by the receiving-plate. Said receiving-plate is then swung outward by the mechanism described, so as to discharge the confection and permit it to fall by gravity upon the delivering-plate. The front wall of the plate 65, through the opening in which the receiving-plate is withdrawn, insures the stripping of the confection from the receiving-plate as it is being withdrawn and prevents it from sticking to the same. After the fall of the confection from the receiving to the delivering plate the guiding and centering arms 57 move inward toward each other, so as to engage the confection after its fall and insure its being properly centered on the delivering-plate. The plunger then reverses its direction of travel and moves downward, whereupon the receiving-plate again moves into position to receive the next confection, and as the plunger approaches its downward limit of motion the delivering-plate is withdrawn to permit the confection to fall by gravity downward through the open lower end of the plunger onto the wrapper, which is ready to receive it. In order to insure the stripping of the confection from the delivering-plate and prevent it from sticking on said plate, stripping devices are provided, consisting of slots 80 in the plate 70 and fixed arms 81, which pass through said slots as the plate is withdrawn from the plunger. The arms 81 are carried by a cross-bar 82, secured to the rear edge of the sides of the plunger. This construction is shown more particularly in Figs. 8 and 12, and it will be seen from these figures that when the plate 70 in swinging downward and outward passes the plane of the rear wall of the plunger any confection adhering to the inner face of the plate will be stripped therefrom by the fixed arms 81.

As a further means for insuring the delivery of the confection from the plunger onto the wrapper I provide an ejecting-arm 83, secured to the shaft 72 and standing normally in an upright position within the plunger out of the path of the confection, as shown in Fig. 8. As the delivering-plate swings down and out this ejecting-arm swings downward and inward along the path of the confection, and in case this latter has any tendency to stick to the interior of the plunger or to the centering-arms 57 said ejecting-arm will detach it and insure its discharge.

*Paper feeding and cutting mechanism.*—The wrappers in which the confections are inclosed are formed from a continuous strip of paper supported at one side of the machine in the form of a roll, from which the paper is drawn intermittently, sufficient paper being drawn out at each operation to form a single wrapper, and after this paper is drawn horizontally and laterally across the machine, so as to lie in the path of the plunger and below the same, the wrapper is cut off. What is technically known as "waxed paper" is preferably employed for this purpose, and provision is made for creasing or breaking the paper in such a way as to insure the proper formation of the initial fold. Referring to this portion of the mechanism, 84 indicates a roll of paper supported on an axis 85, journaled in blocks 86, adapted to slide in vertical ways 87 in standards 88, located at one side of the machine. The vertical movement of the blocks 86 is to compensate for the decrease in the diameter of the roll as the paper is drawn from it, and said vertical movement is controlled by spiral cams 89, carried by a shaft 90, mounted in the standards 88 and provided with a hand-wheel 91, by means of which said shaft may be readily rotated. The bearing-blocks 86 are provided with projections 92, which rest upon the cams 89.

The paper-roll 84 rests upon the shaft 91, and the paper strip (indicated at 93) is drawn horizontally from the bottom of the roll and passes thence to the creasing or breaking devices. These latter are supported by standards 94, provided with arms 95, which carry a plurality of flat rollers 96, over which the strip passes. Immediately above the strip and pressing the same against the rollers 96 are a plurality of rollers 97, having relatively sharp peripheries, said rollers being mounted in arms 98, pivoted on a rod 99, carried by the standards 94, each arm having a spring 100, by means of which its roller 97 is caused to press against the paper as it is drawn under it, the roller 96 forming a bed or resistance to render said pressure effectual. By this means the strip of paper has its fiber broken longitudinally, so as to insure its bending properly and evenly under the operation of the folding devices.

The paper passes from the creasing-rollers 97 to a supporting-plate 101, over which the paper passes and by means of which it is held during and after the cutting operations. A guard-plate 102 is located above the supporting-plate 101, and the paper passes through the slot or opening 103 between said plates. For the purpose hereinafter described the supporting-plate 101 is adapted to yield horizontally in the direction of travel of the paper, and to this end said plate is supported by rods 104, which pass through guides or keepers 105, supported by the arms 95 and standards 94, and springs 106, mounted on the rods 104, serve to hold the supporting-plate 101 normally outward in the position shown, although permitting it to recede.

The feeding of the paper is accomplished by means of a reciprocating gripper (indicated as a whole by the reference-numeral 107) which seizes the end of the paper and pulls or draws out a quantity sufficient to make a wrapper. This gripper (shown in detail in Fig. 13 of the drawings) comprises a slide or body 108, moving in ways 109 transversely of the machine and lying opposite to the supporting-plate 101 and in line with the same. The ways 109 are formed on the upper portions of brackets 110 and 111, arising from the bed 1 or from a base-plate 112, secured thereon. The body 108 of the gripper carries at its forward end a fixed jaw 113, over which extends stripper-springs 114, and above this fixed jaw there is located a movable jaw 115, secured on a shaft 116, mounted in lugs 117 on the body 108. The shaft 116 is provided with an upwardly-extending arm 118, terminating in an antifriction-roller 119, the bottom of said arm being flat and resting on a flat spring 120, which holds the said arm and the movable jaw 115 normally in the position shown in Fig. 9. Arms 121, extending up from the bracket 111, support a cam-bar 122, which lies in the path of the upper end of the arm 118 and serves to operate the movable jaw of the gripper in the manner hereinafter described.

A reciprocating motion is imparted to the gripper by means of a link 123, pivoted at one end at 124 to the body of the gripper, its other end being pivoted at 125 to the forward end of a lever 126, which latter is in turn pivoted between its ends at 127 to an arm 128, extending upward from the bed. The lever 126 lies adjacent to the intermittently-rotating shaft 12, and said shaft is provided on opposite sides of the pivot of the lever with cam-arms 129 and 130, which are adapted to strike the lever 126 alternately, said lever being provided with antifriction-rollers 131 and 132, with which the cam-arms contact. It will thus be seen that at each revolution of the shaft 12 the gripper will be caused to travel from its normal position, as shown, across the path of the plunger and back again. During its forward movement the upper end of the arm 118 strikes the face 122$^a$ of the cam-bar 122, thereby raising the movable jaw 115 of the gripper and opening the gripper, which is held open during the remainder of the forward travel of the gripper by reason of the contact of the upper end of the arm 118 with the horizontal under surface 122$^b$ of the cam-bar. As the gripper approaches with open jaws the end of its forward movement the advance edge of the fixed jaw 113 comes into contact with the supporting-plate 101 and pushes back said plate and its guard-plate, so as to permit the forward edge of the paper, which is even with the front edge of the supporting-plate, to pass in between the jaws of the gripper. The arm 118 then passes beyond the end of the cam-bar 122, and the spring 120 throws the arm 18 again into vertical position. The movement of recession of the gripper immediately begins, whereupon the upper end of the arm 118 comes into contact with the other vertical face 122$^c$ of the cam-bar, and the movable jaw 115 is forced down upon the fixed jaw, so as to grip the free end of the paper. The jaws are held closed during the return movement of the gripper by reason of the contact of the upper end of the arm 18 with the under surface 122$^b$ of the cam-bar, so that the paper is drawn out during the receiving movement of the gripper until a sufficient quantity to form a wrapper lies across the path of the plunger. When the gripper has reached the end of its return movement, the arm 118 passes free of the cam-bar and the paper is released.

The movable jaw 115 of the gripper is provided with a facing, of rubber, 133, which gives a better hold and prevents the paper from adhering to the movable jaw. The stripper-springs 114 lie in grooves 134 in the fixed jaws when the jaws are closed, and when said jaws are open said stripper-springs rise and prevent adhesion of the paper to the fixed jaw. The paper is cut while still under tension by the pull of the gripper, and for this purpose the gripper stops or dwells for a moment just before the arm 118 leaves the cam-bar to open the jaws. To this end the gear-segment 10 is provided with a blank space 135, by means of which the rotation of the shaft 12 and movement of the lever 126 is momentarily arrested. During this momentary stoppage of the movement of the paper while still under tension the cutting is effected by the following mechanism: A knife 136 travels between fixed guides 137 in a plane immediately adjacent to the edge of the supporting-plate 101 when this latter is advanced. One of the guides 137 is slotted longitudinally, as indicated at 138, to receive a pin or roller 139, carried by the forward end of the knife. This slot is inclined so as to give the knife a draw cut, in order to more effectually sever the paper, the supporting-plate 101 acting as a ledger-plate to coöperate with the knife during the cut. Motion is imparted to the knife by means of a crank-arm 140, to which the rear end of the knife is pivotally connected, said crank-arm being located on the end of a shaft 141, carried in a slide 142, reciprocating on two vertical rods 143, arising from the bed. Springs 144 on said rods serve to hold the slide normally in a raised position. One of the guides 143 is provided with a rack 145, with which meshes a pinion 146 on the shaft 141, so that vertical movement of the slide 142 will cause the pinion to rotate and thereby operate the knife. Motion is imparted to the slide by means of a lever 147, pivoted at 148 on the support 44. The forward end of this lever bears upon the top of the slide 142, while its rear end lies in the path of a projection or roller 149 on the master-gear 6. The construction is such that the paper is severed during the temporary stoppage of the receiving motion of the gripper hereinbefore referred to, so that the cut is made while the paper is under tension.

In order to insure the positive stoppage of the receding movement of the gripper, both at its momentary dwell and at the end of said movement, there is secured to the shaft 12 a stop-wheel 12ª, having in its periphery two stop-notches 12ᵇ and 12ᶜ, adapted to be engaged by a detent-spring 12ᵈ, arising from the bed 1. When the pinion 11 is reached by the blank space 135, the spring 12ᵈ enters the notch 12ᵇ and stops the shaft 12, preventing "overthrow" through the inertia of the parts and insuring the temporary stopping of the gripper at the proper point. A tooth 10ª follows the blank space 135 and completes the receding or drawing-out movement of the gripper, whereupon the spring 12ᵈ enters the notch 12ᶜ and positively stops the gripper at the end of said receiving movement.

*Folding and twisting devices.*—The blank wrapper having thus been cut while it lies in the path of the plunger, is first given an initial fold, which gives it a trough-like or U shape in section. This preliminary fold is accomplished by the plunger in connection with folding-plates, which will be now referred to.

The plunger is provided at its lower end with downwardly-directed needle-points 150, and said plunger has a preliminary or initial downward movement, which causes these needle-points to pierce the paper while the said paper is still under tension and immediately before it is cut off. The downward movement of the plunger is temporarily arrested during the cutting, and to this end the cam 41, which operates the plunger, is provided with a concentric portion 151, which arrests temporarily the movement of the lever 42, which actuates the plunger. After the paper is cut the plunger begins anew its downward movement, carrying with it the wrapper, which is forced downward between folding-plates 152 and 153, supported from the brackets 110 and 111. This gives the wrapper a trough-like or U shape, bending up its front and rear ends, and the wrapper is carried down until it rests upon a supporting-plate 154, which receives the wrapper and the candy deposited thereon by the plunger in the manner hereinbefore described, and holds the same during the operations of folding and twisting the wrapper. The plunger having reached its downward limit and deposited the confection on the wrapper then recedes, and to prevent the wrapper from following the plunger in its upward motion stripping devices are provided, substantially as follows: From the folding-plate 153 there extends downward a stripping-plate 155, said plate being a spring-plate, terminating in an engaging edge or point 156, which prevents the return of the rear edge of the wrapper. The bracket 110 on the other side, or in front of the plunger, is provided with projections 157, on which are pivoted stripper-dogs 158, one on each side of the folding and supporting plates hereinafter referred to, as shown in Fig. 12. Each stripper-dog is provided with an arm 159, carrying a needle-point 160, and with a second arm 161, lying normally in the path of the plunger. A third arm 162, acted on by a spring 163, serves to hold the stripper-dogs in either operative or inoperative position. Normally these dogs are in the position shown in Fig. 11, so that when the plunger descends it strikes the arms 161 and throws the needle-points 160 out into position to engage the paper and prevent its upward movement during the return of the plunger. The dogs are held in this position by the springs 163 until after the plunger has been withdrawn and are then subsequently returned to their normal positions before the plunger again descends, by means of a cam or cams 164, to be hereinafter described, which operate on arms 165 of said dogs and return them to the position shown. By means of this stripping mechanism the wrapper is prevented from moving upward when the plunger is withdrawn. The wrapper is then folded around the confection, its rear edge being first folded over by means of the following mechanism: 166 indicates a folding-plate, preferably semicircular in cross-section, as shown, and carried on the forward end of a longitudinally-reciprocating rod 167, extending along the central line of the machine to the rear end thereof. This rod is supported in bearings 168 on arms 169, arising from the bed 1, and is normally held in its withdrawn position, as shown, by means of a spring 170, coiled around the rod and abutting at one end against one of the bearings 168 and at the other end against a collar 171, secured on the rod. The rear end of the rod 167 extends out through the hollow shaft 3, which thus forms a guide and support for it, and said rear end lies in the path of a cam 172, secured to the master-wheel 6, and serving to move the rod and folding-plate forward at the proper time to make the fold. To assist the the folding-plate 166 in its operation, it is provided with a folding-blade 173, curved to conform to the plate 166, which latter is provided with guides 174, in which said blade may travel. This blade is projected forward over the rear portion of the wrapper, so as to insure said rear portion being properly bent down around the confection, and this projecting of the blade occurs during the forward movement of the plate and is effected by the following mechanism: The blade is provided at its lower end with an arm 175, to which is pivoted the forward end of a link 176, and the rear end of said link is pivoted to the upper end of a lever 177, having a fulcrum between its ends at 178 on a projection 179, extending rearward from the bracket 111. The blade is held normally withdrawn within the plate by means of a spring 180, having an arm 181, which bears against the front of the lower end of the lever 177. As the rod 167 advances carrying, the plate and blade with it, the spring 181 by its pressure against the lower end of the lever 177 moves the upper end of said lever, to which the link 176 is connected, forward, so as to maintain the blade in its withdrawn position until toward the end of the advancing movement of the folding-plate. At this point a dog or projection 182 on the rod 167 comes into contact with the lower end of the lever 177 and, moving the same forward, withdraws the upper end of the lever into the intermediate position shown in dotted lines in Fig. 8, thereby moving the blade 173 outward in the arc of a circle and causing it to complete the folding down of the rear flap of the wrapper around the confection. As soon as this part of the folding operation is completed the front edge of the wrapper is folded over the rear edge and around the confection by means of the front folding-plate 183, which is a curved plate similar to the plate 166, but provided with a needle-point 184 to pierce the wrapper, enter the confection, and hold the wrapper and confection firmly during the twisting operation. This folding-plate 183 is secured to the end of a slide-plate 185, sliding longitudinally of the machine on a support 186, having a slot 187, through which passes a pin 188, by means of which the sliding plate 185 is connected with the arm 189, by means of which it is operated, said arm 189 being provided with a slot 190, into which the lower end of the pin 188 projects. The arm 189 is secured to the lower end of a vertical sleeve 191, mounted on an upright shaft 192, arising from the bed 1, said sleeve being provided on its upper end with an arm 193, to which is connected one end of a rod 194, which extends to the rear of the machine, passing through a suitable guiding-aperture 195 in the rear bracket 8. The rear end of this rod lies in the path of a cam 196 on the front face of the gear-wheel 6, so that at the proper time the rod 194 is pushed forward, rocking the sleeve 191 and causing the front folding-plate 183 to advance. The plate is returned to its position by a spring 197, acting on the sleeve 191.

It may be here stated that the supporting-plate 154 is operated in a similar manner by a similar cam 196$^a$. Said plate is supported in ways 198 on the under side of a plate 199, having a slot 200, through which extends from the plate a pin 201, which enters a slot 202 in an arm 203, extending from a sleeve 204, mounted on the shaft 192 within the sleeve 191. The sleeve 191 is provided near its upper end with a slot or opening 205, through which there projects from the sleeve 204 an arm 206, to which is pivoted the front end of a push-rod 207, which also extends to the rear of the machine, passing through a guiding-aperture 208 in the bracket 8 and having its rear end arranged in the path of a cam 196$^a$. The cams on the wheel 6, controlling the rods 194 and 207, are so arranged that the former is first operated so that the folding-plate 183 is withdrawn slightly before the supporting-plate 154. A spring 197$^a$ is connected to the arm 203, so as to return said arm and the sleeve 204 to their normal positions after the cam 196$^a$ has operated. These operations do not take place, however, until after the twisting of the ends of the wrapper; and this twisting is accomplished by the following mechanism: On opposite sides of the central line of the machine are arranged in axial alinement with each other shafts 209 and 210, supported in bearings 211, arising from the bed 1. On each shaft between the bearings 211 is mounted a sleeve 212, connected with the shaft by a pin 213 and slot 214 or any other suitable arrangement which will permit the shaft to slide while compelling it to rotate along with the sleeve. Each sleeve 212 is provided with a bevel-pinion 215, which meshes with a similar pinion 216 on a longitudinal shaft 217, having at its rear end a bevel-pinion 218. The pinions 218 mesh with similar pinions 219 on the ends of a shaft 220, having on its intermediate part a bevel-pinion 221, which meshes with a bevel-pinion 222 on the end of the shaft 3. In this way a continuous rotary motion in opposite directions is imparted to the shafts 209 and 210.

Each shaft is provided with a twister-head comprising a fixed head 223, secured on the end of the shaft, and a sliding head 224, sliding on the shaft, but rotating along with it. The twister-arms 225 are pivoted to the fixed head 223 and pass out between slots in the sliding head 224, said sliding head having pins 226, which engage diagonal slots 227 in the twisting-arms. The construction is such that when the sliding heads are withdrawn the twisting-arms stand in positions substantially radial to the shaft, and when the sliding heads are moved forward the twisting-arms move downward into positions substantially parallel with the shaft. Each twisting-arm is provided with a twisting-finger 228, having a needle-point 229 to engage the paper. Each of the twister-shafts is normally drawn out or away from the other shaft by means of a spring 230, acting through an arm 231 on a collar 232 on the shaft. The twisters and shafts are advanced and retracted by means of cams 233 on the front end of the shaft 7. Each cam 233 has engaged with it the upper end of a lever 234, supported from the front upright 9 and engaging at its lower end an arm 235 on a rock-shaft 236, mounted in bearings on the under side of the bed 1. Each rock-shaft 236 is provided with an arm 237, extending up through a slot in the bed and forked at its upper end, its forked extremities being slotted to engage pins 238 on a collar 239, secured to the sliding head 224. It results from this construction that when the levers 234 are operated to advance the twisters the sliding heads are first advanced, the shafts being restrained by their springs, so that the first movement is a closing movement of the twisting-fingers upon the ends of the folded wrapper. The sliding heads then continue to advance while they rotate, carrying along with them the shafts and fixed heads, so that both twisters move toward each other as they rotate, and by the engagement of the twisting-fingers and their needle-points with the wrapper the ends thereof are twisted in opposite directions. The advance movement of the twisters compensates for the shortening of the wrapper as it is twisted.

After the twisting is completed the twisters recede, so as to release the wrapped confection. If this receding movement occurred with both of the twisters in engagement with the wrapper, this latter would be torn, and provision is therefore made for causing one of the twisters to release its grip upon the wrapper before it recedes. To this end the shaft 210 has mounted behind it a vertically-sliding stop-plate 240, carrying a stop-block 241, provided with a recess 242 to receive the end of the shaft 210, and with an incline 243 to relieve its outward movement. This plate is operated by an arm 244, mounted on the shaft 236, which is connected with the shaft 210, said arm 244 extending through a slot 245 in the plate 240. The plate 240 is provided with a detent-recess 246, adapted to be engaged by a detent-spring 247. The construction of these parts is such that when the shaft 210 is advanced in the manner hereinbefore described the plate 240 is moved upward until the end of the shaft 210 is opposite the recess 242, and at the same time the detent-spring 247 engages the recess 246 and holds the plate 240 in this position. At the beginning of the return movement of the twisters the shaft 210 cannot move outward under the impulse of its spring, being prevented by the stop-block 241, so that the movable twister-head member 224 on said shaft moves out first, withdrawing the twisting-fingers from contact with the wrapper. After this release of the fingers the arm 244 strikes the bottom of the slot 245, the locking-plate 240 is withdrawn, and the twister-shaft 210 may move outward simultaneously with the shaft 209.

It is obvious that a similar provision might be applied to both twisters instead of to one only, although this latter is sufficient.

The confection having been thus wrapped, the supporting-plate 154 is withdrawn by means of the mechanism provided for that purpose, and the confection is discharged by gravity. It may pass downward through a suitable opening 248 in the bed and be discharged into any suitable receptacle. For convenience in operation I provide upon the supporting-plate 154 the cam 164, which by its engagement with the arms 165 of the stripper-dogs 158 serves to return these latter to the position shown in Fig. 11, ready to be again operated by the plunger upon its descent.

Since the operation of the different mechanisms of which the machine is composed has been described in detail in connection with the structural description thereof, it is unnecessary to here repeat the same. It will be seen, however, that the machine as a whole is adapted to draw the candy from batch, shape it and feed it forward, cut it up or subdivide it into confections, carry these confections to the wrapping-point, feed forward the paper and cut it into wrappers, fold these wrappers around the confection, and complete the operation by twisting the ends of the wrappers. The completed product of the machine is shown in Fig. 15. It will also be seen that these operations are automatically and rapidly performed and that means are provided for insuring the proper operation of the various parts of the machine, and provision is made to adapt it to the peculiar characteristics of the materials on which it operates.

I do not wish to be understood as limiting myself to the precise details of construction hereinbefore described and shown in the accompanying drawings, as it is obvious that these details may be varied without departing from the principle of my invention.

In Figs. 16, 17, and 18 I have illustrated a modified form of the twister-head designed to give to the twisted ends of the wrapper an open or cup-like form. To this end the twister-shaft 210 terminates at the rear end of the fixed head 223, and a mandrel 249 is mounted to slide in the bore of the fixed head, being connected with the movable head 224 by a pin 250, passing through slots 251 in the fixed head. The rear ends of the slots 227 are so shaped that as the movable head advances from the position shown in full lines in Fig. 17 the mandrel is first projected, as shown in dotted lines, so as to enter the end of the wrapper, and the twisting-finger subsequently moves down toward the mandrel, holding the end of the wrapper on it during the twisting, so that an open or cup-like form is given to said end, as shown in Fig. 15. The mandrel is preferably provided with a cover 252, of rubber or the like, and the needle-points 229 are dispensed with.

Having thus fully described my invention, what I claim as new, and desire to secure by Letters Patent, is—

1. In a machine of the character described, the combination, with means for forming the confection, of a vertically-reciprocating hollow plunger, coöperating stationary folding members, means for feeding the wrapper across the path of the plunger between it and said members, whereby the downward movement of the plunger gives the wrapper its initial fold, means for depositing the confection by gravity through the plunger upon the wrapper, means for successively folding the marginal portions of the wrapper around the confection, and means for twisting the ends of the wrapper, substantially as described.

2. The combination, with means for forming the confection, of a plunger for conveying the confection to the wrapping mechanism, said plunger being provided with receiving and delivery plates, and wrapping mechanism, substantially as described.

3. In a machine of the character described, a plunger and wrapping mechanism the plunger acting to convey the confection from the cutter to the wrapping mechanism, and being provided with receiving and delivery plates, and means for centering the confection upon the delivery-plate, substantially as described.

4. In a machine of the character described, a plunger and wrapping mechanism the plunger acting to convey the confection from the cutter to the wrapping mechanism, and being provided with movable receiving and delivery plates, and stripping devices for said plates, substantially as described.

5. In a machine of the character described, the combination, with means for forming the confection, and wrapping mechanism, of a plunger for conveying the confection between the same, having receiving and delivery plates and a positively-acting ejector, substantially as described.

6. In a machine of the character described, the combination, with means for forming the confection, and wrapping mechanism, of a conveying-plunger having receiving and delivering plates, stripping devices for said plates, means for centering the confection on the delivery-plate, and a positively-acting ejector, substantially as described.

7. In a machine of the character described, the combination, with confection-forming means, of a vertically-movable plunger having receiving and delivery devices, means for feeding the wrapper across the path of the plunger, means for folding the opposite marginal portions of the wrapper around the confection, and means for twisting the ends of the wrapper, substantially as described.

8. In a machine of the character described, the combination, with a conveying-plunger, of means for feeding the wrapper across the path of the plunger, means for "breaking" or initially creasing the wrapper, means for folding the opposite marginal portions of the wrapper around the confection, and means for twisting the ends of the wrapper, substantially as described.

9. In a machine of the character described, the combination, with a vertically-reciprocating hollow plunger, and coöperating stationary folding members, of means for feeding the wrapper across the path of the plunger between it and said members, whereby the downward movement of the plunger gives the wrapper its initial fold, means for depositing the confection by gravity through the plunger upon the wrapper, means for successively folding the marginal portions of the wrapper around the confection, and means for twisting the ends of the wrapper, substantially as described.

10. In a machine of the character described, the combination, with a vertically-reciprocating hollow plunger, and coöperating stationary folding members, of means for feeding the wrapper across the path of the plunger between it and said members, whereby the downward movement of the plunger gives the wrapper its initial fold, means for depositing the confection by gravity through the plunger upon the wrapper, means for successively folding the marginal portions of the wrapper around the confection, and means for twisting the ends of the wrapper, said last-mentioned means comprising separate twisters located at opposite ends of the wrapped confections, and rotating in opposite directions, substantially as described.

11. In a machine of the character described, the combination, with a vertically-reciprocating hollow plunger, and coöperating stationary folding members, of means for supplying a continuous wrapper-strip, means for feeding said strip across the path of the plunger between it and said folding members and means for severing the wrapper-blank from the strip, whereby the downward movement of the plunger gives the wrapper its initial fold, means for depositing the confection by gravity through the plunger upon the wrapper, means for successively folding the marginal portions of the wrapper around the confection, and means for twisting the ends of the wrapper after it is severed and folded, substantially as described.

12. In a machine of the character described, the combination, with a vertically-reciprocating hollow plunger, and coöperating stationary folding members, of means for supplying a continuous wrapper-strip, a support and coöperating cutter located on one side of the plunger, a reciprocating gripper moving across the path of the plunger to engage the wrapper-strip and draw the wrapper across the path of the plunger between it and said folding members, means for operating said gripper to cause it to grip and release the strip, the downward movement of the plunger giving the wrapper its initial fold, means for depositing the confection by gravity through the plunger upon the wrapper after the initial fold, means for successively folding the marginal portions of the wrapper around the confection, and means for twisting the ends of the wrapper, substantially as described.

13. In a machine of the character described, the combination, with means for supplying a continuous flat wrapper-strip, of a support for said strip, a cutter coöperating with said support to sever the wrapper from the strip, a gripper reciprocating toward and from said support, means for operating said gripper to cause it to engage the severed end of the strip and draw said strip out prior to the next operation of the cutter and then release the same, and means for folding the severed wrapper around the confection and twisting the ends thereof, substantially as described.

14. In a machine of the character described, the combination, with a yielding support for the wrapper-strip, and a cutter coöperating therewith, of a reciprocating gripper adapted to push back the support and grip and pull out the strip before it is cut, substantially as described.

15. In a machine of the character described, a hollow plunger, means for feeding the wrapper across its path, folding-plates coöperating with the plunger to give the wrapper its initial fold, means for depositing the confection by gravity through the plunger upon the wrapper after its initial fold, and strippers to prevent the wrapper from following the receding plunger, substantially as described.

16. In a machine of the character described, the combination, with a hollow plunger which gives the wrapper its initial fold, and means for depositing the confection by gravity through the plunger upon the wrapper of coöperating folding-plates, one of said plates being provided with stripping-fingers to engage the wrapper, and means for operating said fingers to cause them to engage and release the wrapper, substantially as described.

17. In a machine of the character described, the combination, with a gripper for pulling out the wrapper-strip across the path of the plunger, and a cutter for severing the strip, of a plunger for forming the first fold of the wrapper, provided with points to engage the wrapper, substantially as described.

18. In a machine of the character described, the combination, with a gripper for pulling out the wrapper-strip across the path of the plunger and maintaining it temporarily under tension in said path, of a plunger for forming the first fold of the wrapper, said plunger being provided with points to engage the wrapper-strip while thus under tension, a cutter for severing the strip after the points of the plunger have engaged the same, and strippers to prevent the wrapper from following the receding plunger, substantially as described.

19. In a machine of the character described, the combination, with a support for the confection while being wrapped, of means for forming the initial fold of the wrapper, comprising stationary folding members and a vertically-reciprocating hollow plunger through which the confection is deposited by gravity upon the wrapper, means for successively folding the upstanding marginal portions of the wrapper around the confection, and separate twisting mechanisms for twisting the respective ends of the wrapper after being thus folded, substantially as described.

20. In a machine of the character described, the combination, with a support for the confection while being wrapped, of means for forming the initial fold, a folding-plate for folding one upstanding edge of the wrapper around the confection, provided with an extensible blade for completing the folding of said edge, a second folding-plate for folding the other edge around the confection, and means for twisting the ends of the folded wrapper, substantially as described.

21. In a machine of the character described, the combination, with a support for the confection while being wrapped, of means for forming the initial fold, and folding-plates movable toward and from each other to successively fold the upstanding edges of the wrapper around the confection, the plate which makes the last fold being provided with a point to engage the confection and wrapper, and means for twisting the ends of the wrapper while thus held, substantially as described.

22. In a machine of the character described, the combination, with a support for the confection while being wrapped, of a hollow plunger to form the first fold of the wrapper and deposit the confection therein on the support, reciprocating folding-plates moving toward each other to fold the wrapper around the confection and hold it during the twisting, means for twisting the ends of the folded wrapper, and means for withdrawing the support and folding-plates after the twisting, substantially as described.

23. In a machine of the character described, the combination, with means for folding the wrapper around the confection and supporting the same, of twisting devices comprising two rotating and reciprocating alined shafts, a twister-head on each shaft provided with twisting-fingers, and means for causing said shafts to approach and recede, and for causing the twisting-fingers to engage the ends of the wrapper during the approach and release the same during the recession, substantially as described.

24. In a machine of the character described, rotary twisters for simultaneously twisting the ends of the wrapper in opposite directions, and means for causing said twisters to approach each other as the wrapper shortens during the twisting, substantially as described.

25. In a machine of the character described, two rotatory twisters for simultaneously twisting the ends of the wrapper in opposite direction, means for causing said twisters to approach each other as the wrapper shortens during the twisting, means for causing said twisters to recede from each other after the twisting, and means for causing the fingers of one of said twisters to open and release the wrapper before such recession, substantially as described.

26. In a machine of the character described, the combination, with a twister for twisting the end of the wrapper, of a mandrel entering said end during the twisting, to form an open or cup-like end for the twist, substantially as described.

27. In a machine of the character described, rotary twister-heads provided with a central mandrel to enter the end of the wrapper, and twisting-fingers movable to close down upon said mandrel during the twisting operation, substantially as described.

In testimony whereof I affix my signature in presence of two witnesses.

DENNIS T. IGOU.

Witnesses:
AL. H. KUNKLE,
IRVINE MILLER.